United States Patent
Kitamura et al.

(10) Patent No.: US 12,523,461 B2
(45) Date of Patent: Jan. 13, 2026

(54) STRAIN GAUGE

(71) Applicant: MINEBEA MITSUMI Inc., Nagano (JP)

(72) Inventors: Atsushi Kitamura, Nagano (JP); Toshiaki Asakawa, Nagano (JP); Yosuke Ogasa, Nagano (JP); Aya Ono, Nagano (JP); Akiyo Yuguchi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 169 days.

(21) Appl. No.: 17/995,504

(22) PCT Filed: Apr. 1, 2021

(86) PCT No.: PCT/JP2021/014177
§ 371 (c)(1),
(2) Date: Oct. 5, 2022

(87) PCT Pub. No.: WO2021/205981
PCT Pub. Date: Oct. 14, 2021

(65) Prior Publication Data
US 2023/0175831 A1    Jun. 8, 2023

(30) Foreign Application Priority Data

Apr. 8, 2020 (JP) .................................. 2020-069842
Oct. 16, 2020 (JP) .................................. 2020-174823
Mar. 29, 2021 (JP) .................................. 2021-055762

(51) Int. Cl.
*G01B 7/16* (2006.01)

(52) U.S. Cl.
CPC ..................... *G01B 7/18* (2013.01)

(58) Field of Classification Search
CPC .... G01B 7/18; G01B 7/16; G01B 7/20; G01L 1/2287; G01L 1/225; G01L 5/0028;
(Continued)

(56) References Cited

U.S. PATENT DOCUMENTS

2018/0259315 A1   9/2018   Nakamura et al.
2020/0325571 A1   10/2020  Asakawa et al.
(Continued)

FOREIGN PATENT DOCUMENTS

JP    S61-275605    12/1986
JP    H03-191802    8/1991
(Continued)

OTHER PUBLICATIONS

Micro Measurements 125UT/125UTA General Purpose Strain Gages—Tee Rosette data sheet (Year: 2019).*
(Continued)

*Primary Examiner* — Timothy P Graves
(74) *Attorney, Agent, or Firm* — IPUSA, PLLC

(57) ABSTRACT

A strain gauge includes a flexible substrate, at least one resistor formed on or above the substrate, and a pair of electrodes formed on or above the substrate, electrodes being electrically coupled to the resistor via lines, respectively. Each of the lines electrically connects an end of the resistor and a given electrode, the end being situated in a width direction of a grid. Each of the lines includes a first metallic layer and a second metallic layer that is formed of a material having a lower resistance than a material of the first metallic layer, the second metallic layer being situated on the first metallic layer.

9 Claims, 7 Drawing Sheets

(58) Field of Classification Search
CPC . G01L 1/20; G01L 1/22; G01L 1/2268; G01L 1/2293; G01L 5/1627; G01L 1/205; G01L 1/2206; G01L 5/228; H05K 1/167; H05K 2201/10151; B25J 13/084; G01K 7/16; G01K 7/18
USPC ..... 338/2, 5; 73/774, 775, 862.625, 862.627
See application file for complete search history.

(56) References Cited

U.S. PATENT DOCUMENTS

| | | | |
|---|---|---|---|
| 2021/0018382 A1 | 1/2021 | Misaizu et al. | |
| 2021/0063258 A1* | 3/2021 | Sato | H05K 1/167 |
| 2023/0358623 A1* | 11/2023 | Ono | G01B 7/16 |

FOREIGN PATENT DOCUMENTS

| | | | |
|---|---|---|---|
| JP | H06-300649 | 10/1994 | |
| JP | H07-36010 U | 7/1995 | |
| JP | H08-000132 U | 1/1996 | |
| JP | H10-270201 | 10/1998 | |
| JP | 2012-138260 | 7/2012 | |
| JP | 2016-074934 | 5/2016 | |
| JP | 2017-101982 | 6/2017 | |
| JP | 2018-066311 | 4/2018 | |
| JP | 2019-066311 | 4/2019 | |
| JP | 2019-113411 | 7/2019 | |
| WO | 2017-094368 | 6/2017 | |
| WO | 2019/082978 | 5/2019 | |
| WO | WO-2019093373 A1 * | 5/2019 | ............. B32B 38/10 |

OTHER PUBLICATIONS

International Search Report of Int. Appl. No. PCT/JP2021/014177 dated Jun. 22, 2021.
Office Action mailed on Jan. 26, 2025 with respect to the corresponding Chinese patent application No. 202180025922.6.
Office Action mailed on May 13, 2025 with respect to the corresponding Japanese patent application No. 2021-055762.
Osamu Watanabe, "Strain Gauges and Their Applications", p. 46-47, May 30, 1971, The Nikkan Kogyo Simbun.
Office Action mailed on Nov. 25, 2025 with respect to the corresponding Japanese patent application No. 2021-055762.

* cited by examiner

STRAIN GAUGE

TECHNICAL FIELD

The present invention relates to a strain gauge.

BACKGROUND ART

A strain gauge is known to be attached to a measured object to detect strain of the measured object. The strain gauge includes a resistor that detects the strain, and is formed on an insulating resin, for example. The resistor is connected to an electrode, for example, via a line (see, for example, Patent Document 1).

CITATION LIST

Patent Document

[Patent Document 1] Japanese Unexamined Patent Application Publication No. 2016-74934

SUMMARY

However, when the line is connected to the resistor, the line functions as a portion of the resistor, and thus there are cases where accuracy in detecting strain may be reduced.

In view of the point described above, an object of the present invention is to provide a strain gauge capable of improving accuracy in detecting strain.

A strain gauge includes a flexible substrate, at least one resistor formed on or above the substrate, and a pair of electrodes formed on or above the substrate, electrodes being electrically coupled to the resistor via lines, respectively. Each of the lines electrically connects an end of the resistor and a given electrode, the end being situated in a width direction of a grid. Each of the lines includes a first metallic layer and a second metallic layer that is formed of a material having a lower resistance than a material of the first metallic layer, the second metallic layer being situated on the first metallic layer.

Effect of the Invention

According to a disclosed technique, a strain gauge capable of improving accuracy in detecting strain can be provided.

DESCRIPTION OF EMBODIMENTS

One or more embodiments will be described below with reference to the drawings. In each figure, the same numerals denote the same components, and accordingly, duplicative description of thereof may be omitted.

First Embodiment

Figure 1:
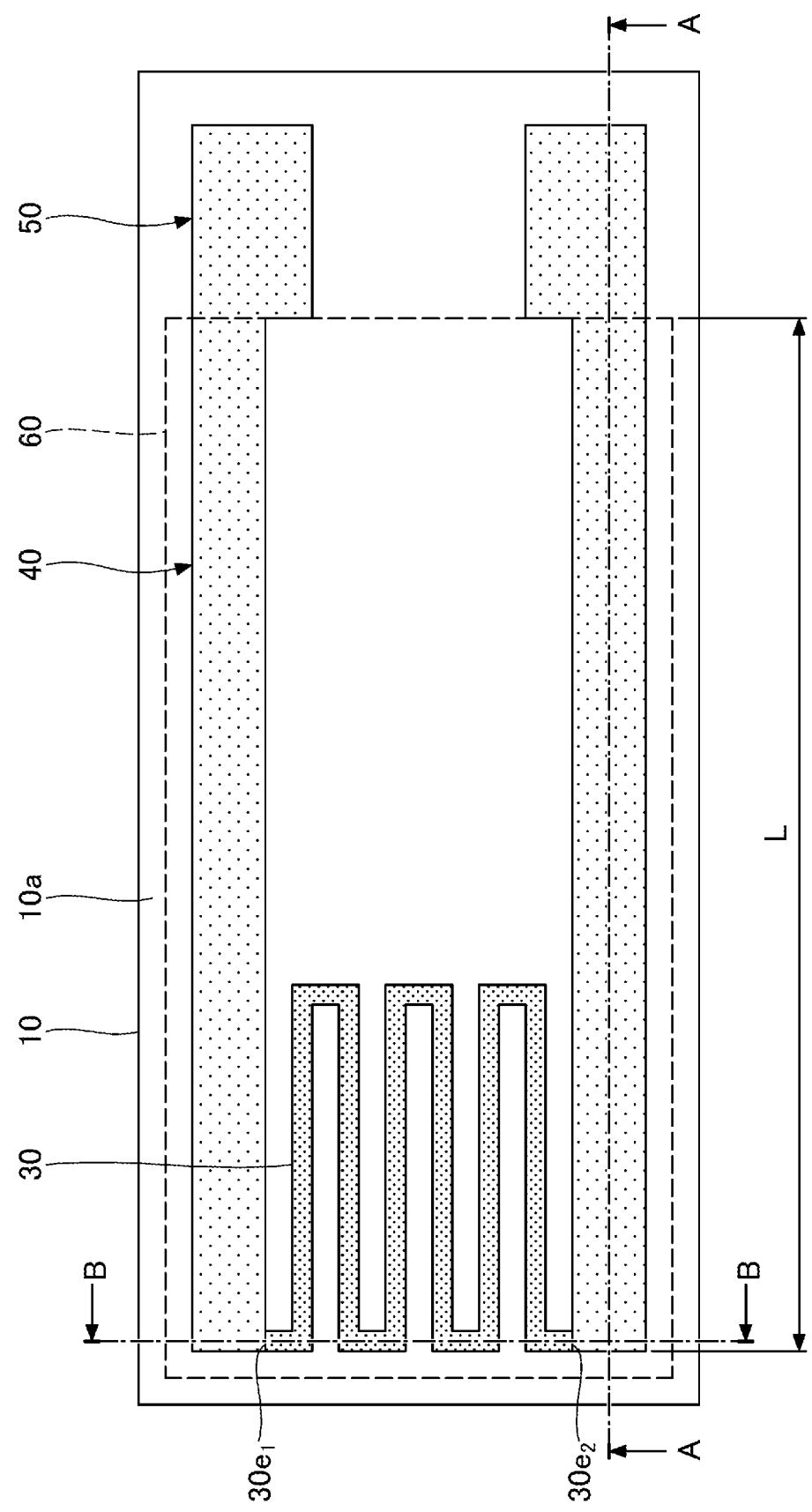
FIG. 1 is a plan view of an example of a strain gauge according to a first embodiment.
Figure 2:
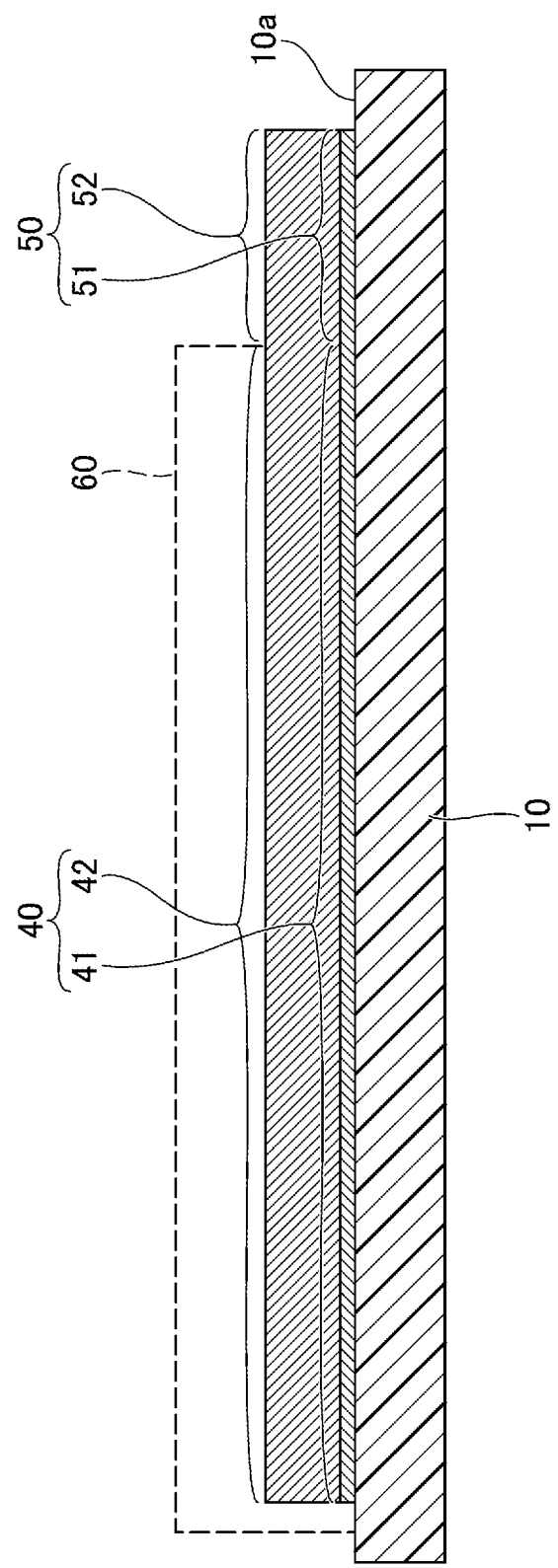
FIG. 2 is a cross-sectional view (first part) of an example of the strain gauge according to the first embodiment.
Figure 3:
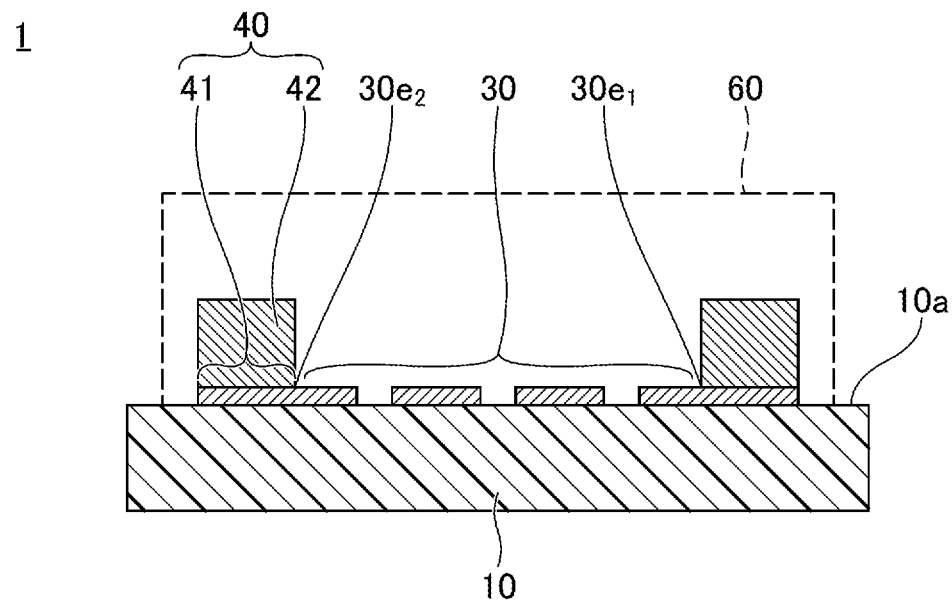
FIG. 3 is a cross-sectional view (second part) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates the cross section taken along the A-A line in FIG. 1. FIG. 3 is a cross-sectional view of an example of the strain gauge according to the first embodiment, and illustrates the cross section taken along the B-B line in FIG. 1. Referring to FIGS. 1 to 3, a strain gauge 1 includes a substrate 10, a resistor 30, lines 40, and electrodes 50.

In the present embodiment, for the sake of convenience, for the strain gauge 1, the side of the substrate 10 where the resistor 30 is provided is referred to as an upper side or one side, and the side of the substrate 10 where the resistor 30 is not provided is referred to as a lower side or another side. Further, for each component, the surface on the side where the resistor 30 is provided is referred to as one surface or an upper surface, and the surface on the side where the resistor 30 is not provided is referred to as another surface or a lower surface. However, the strain gauge 1 can be used in a state of being upside down, or can be disposed at any angle. Further, a plan view means that an object is viewed in a direction normal to an upper surface 10a of the substrate 10, and a planar shape refers to a shape of an object when viewed in the direction normal to the upper surface 10a of the substrate 10.

The substrate 10 is a member that is a base layer for forming the resistor 30 or the like, and is flexible. The thickness of the substrate 10 is not particularly restricted and can be appropriately selected for any purpose. For example, such a thickness can be approximately 5 μm to 500 μm. In particular, when the film thickness of the substrate 10 is 5 μm to 200 μm, it is preferable in terms of strain transfer from a flexure element surface that is bonded to a lower surface of the substrate 10 via an adhesive layer or the like and of dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. The film refers to a flexible member having the thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

An example of the material of the substrate 10, other than a resin, includes a crystalline material such as $SiO_2$, $ZrO_2$ (including YSZ), Si, $Si_2N_3$, $Al_2O_3$ (including sapphire), ZnO, or a perovskite-based ceramic ($CaTiO_3$, $BaTiO_3$). Also, an example of the material of the substrate 10 includes any other material such as amorphous glass. As the material of the substrate 10, metal such as aluminum, an aluminum alloy (duralumin), or titanium may be used. In this case, for example, an insulating film is formed on the substrate 10 that is made of metal.

The resistor 30 is a thin film formed in a predetermined pattern and is a sensitive section where resistance varies in accordance with strain. The resistor 30 may be formed directly on the upper surface 10a of the substrate 10, or may be formed above the upper surface 10a of the substrate 10, via another layer. In FIG. 1, for the sake of convenience, the resistor 30 is illustrated in a dark crepe pattern.

The resistor 30 can be formed of, for example, material including Cr (chromium), material including Ni (nickel), or material including both Cr and Ni. In other words, the resistor 30 can be formed of material including at least one of Cr or Ni. An example of the material including Cr includes a Cr composite film. An example of the material including nickel includes Cu—Ni (copper nickel). An example of the material including both Cr and Ni includes Ni—Cr (nickel chromium).

Here, the Cr composite film is a composite film of Cr, CrN, and $Cr_2N$, and the like. The Cr composite film may include incidental impurities such as chromium oxide.

The thickness of the resistor 30 is not particularly restricted and can be appropriately selected for any purpose. The thickness can be, for example, approximately 0.05 μm to 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reductions in cracks of a given film caused by internal stress of the film that constitutes the resistor 30, or reductions in warp in the substrate 10. In view of specifications concerning resistance values, transverse sensitivity, or the like, the width of the resistor 30 is optimized and can be, for example, approximately 10 μm to 100 μm, in consideration of disconnection measures.

For example, when the resistor 30 is a Cr composite film, the resistor 30 is formed with α-Cr (alpha-chromium), as a main component, that has a stable crystalline phase, and thus stability of the gauge characteristics can be improved. By forming the resistor 30 with α-Cr as the main component, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. Here, the main component means that a target substance is at 50% by weight or more of total substances that constitute the resistor. The resistor 30 preferably includes α-Cr at 80% by weight or more, from the viewpoint of improving the gauge characteristics. More preferably, the resistor 30 includes α-Cr at 90% by weight or more. The α-Cr is Cr having a bcc structure (body-centered cubic structure).

When the resistor 30 is the Cr composite film, CrN and $Cr_2N$ included in the Cr composite film are preferably at 20% by weight or less. When CrN and $Cr_2N$ included in the Cr composite film are at 20% by weight or less, reductions in the gauge factor can be suppressed.

A percentage of $Cr_2N$ in the CrN and $Cr_2N$ is preferably greater than or equal to 80% by weight and less than 90% by weight, and more preferably greater than or equal to 90% by weight and less than 95% by weight. When the percentage of $Cr_2N$ in the CrN and $Cr_2N$ is greater than or equal to 90% by weight and less than 95% by weight, TCR (negative TCR) is further reduced significantly by $Cr_2N$ having a semiconductor characteristic. Further, with reductions in making of ceramics, brittle fracture is reduced.

When a trace amount of $N_2$ or atomic N, which is mixed into a given film, is present, the external environment (e.g., in a high temperature environment) causes the trace amount of $N_2$ or atomic N to escape from the given film, thereby resulting in changes in film stress. By creating chemically stable CrN, a stable strain gauge can be obtained without forming the unstable N.

The lines 40 are formed on the substrate 10. Each line 40 includes a first metallic layer 41 and a second metallic layer 42 laminated on an upper surface of the first metallic layer 41. The line 40 is limited to being linear and can be formed in any pattern. The line 40 can have any length. In FIG. 1, for the sake of convenience, the lines 40 and the electrodes 50 are illustrated in a lighter crepe pattern than the resistor 30.

The resistor 30 has a structure in which a plurality of elongated portions are arranged at predetermined intervals such that the longitudinal direction of each elongated portion is the same direction (direction of the line A-A in FIG. 1), and in the structure, ends of adjacent elongated portions are alternatively coupled to each other so that the elongated portions are folded back in a zigzag manner as a whole. The longitudinal direction of each of the elongated portions refers to a grid direction, and a direction perpendicular to the grid direction is a width direction of a grid (direction of the line B-B in FIG. 1).

For one end of each of two elongated portions, in the longitudinal direction, each of which is located on an outermost side when viewed in the width direction of the grid, one ends are respectively bent in the width direction of the grid to form ends $30e_1$ and $30e_2$ of the resistor 30 in the width direction of the grid. The resistor 30 in the width direction of the grid is coupled, at the ends $30e_1$ and $30e_2$, to the electrodes 50 via the lines 40, respectively. In other words, the lines 40 electrically connect the respective ends $30e_1$ and $30e_2$ of the resistor 30 in the width direction of the grid, as well as connecting the respective electrodes 50.

The electrodes 50 are formed on the substrate 10, and are each electrically coupled to the resistor 30 via a corresponding line 40. For example, the electrodes 50 are each wider than the line 40 to have a substantially rectangular shape. The electrodes 50 are a pair of electrodes for externally outputting changes in a resistance value of the resistor 30 in accordance with strain, and for example, a lead wire or the like for an external connection is joined to each electrode 50.

The electrodes 50 include a pair of first metallic layers 51 and second metallic layers 52 that are respectively laminated on the upper surfaces of the first metallic layers 51. The first metallic layers 51 are electrically respectively coupled to the ends $30e_1$ and $30e_2$ of the resistor 30 via the first metallic layers 41 of the lines 40. Each first metallic layer 51 is formed to have a substantially rectangular shape in a plan view. The first metallic layer 51 may be formed to have the same width as the line 40.

For the sake of convenience, the resistor 30, the first metallic layer 41, and the first metallic layer 51 are indicated by different numerals. However, the resistor 30, the first metallic layer 41, and the first metallic layer 51 can be integrally formed of the same material, in the same process. With this arrangement, the resistor 30, the first metallic layer 41, and the first metallic layer 51 have substantially the same thickness. Also, for the sake of convenience, the second metallic layer 42 and the second metallic layer 52 are indicated by different numerals. However, the second metallic layer 42 and the second metallic layer 52 can be integrally formed of the same material, in the same process. With this arrangement, the second metallic layer 42 and the second metallic layer 52 have substantially the same thickness.

The second metallic layers 42 and 52 are each formed of a material having a lower resistance than the resistor 30 (first metallic layers 41 and 51). As long as the material of each of the second metallic layers 42 and 52 is the material having a lower resistance than the resistor 30, the material of each of the second metallic layers 42 and 52 is not particularly restricted. Such a material can be selected for any purpose. For example, when the resistor 30 is a Cr composite film, the material of each of the second metallic layers 42 and 52 includes Cu, Ni, Al, Ag, Au, Pt, or the like; an alloy of any metals among the above metals; a compound of any metal among the above metals; or a laminated film in which any metal among the metals, the alloy, and the compound are laminated as appropriate. The thickness of each of the second metallic layers 42 and 52 is not particularly restricted and can be selected for any purpose. Such a thickness can be approximately 3 µm to 5 µm, for example.

The second metallic layers 42 and 52 may be respectively formed on portions of the upper surfaces of the first metallic layers 41 and 51, or may be respectively formed on the entire upper surfaces of the first metallic layers 41 and 51. One or more other metallic layers may be further formed on and above the upper surface of each second metallic layer 52. For example, the second metallic layer 52 is a copper layer, and a gold layer may be laminated on the upper surface of the copper layer. Alternatively, the second metallic layer 52 is a copper layer, and a palladium layer and a gold layer may be alternatively laminated on and above the upper surface of the copper layer. By disposing the copper layer in an uppermost layer of each electrode 50, solder wettability of the electrode 50 can be increased.

A cover layer 60 (insulating resin layer) may be disposed on and above the upper surface 10a of the substrate 10, such that the resistor 30 and lines 40 are coated and the electrodes 50 are exposed. With the cover layer 60 being provided, mechanical damage and the like can be prevented from occurring in the resistor 30 and lines 40. Additionally, with the cover layer 60 being provided, the resistor 30 and lines 40 can be protected against moisture and the like. The cover layer 60 may be provided to cover all portions except for the electrodes 50.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted and can be appropriately selected for any purpose. For example, the thickness can be approximately 2 µm to 30 µm.

As described above, each line 40 has a structure in which the second metallic layer 42 is laminated on the first metallic layer 41 that is made of the same material as the resistor 30. With this arrangement, the resistance of the line 40 is lower than that of the resistor 30, and thus the line 40 can be inhibited from functioning as a resistor. As a result, accuracy in detecting strain through the resistor 30 can be improved.

In other words, by providing each line 40 having a lower resistance than the resistor 30, a substantial sensitive section of the strain gauge 1 can be limited to a local region where the resistor 30 is formed. With this arrangement, accuracy in detecting strain through the resistor 30 can be improved. In particular, for the strain gauge with high sensitivity in which a Cr composite film is used as the resistor 30 and the gauge factor is 10 or more, when the resistance of the line 40 is set to be lower than that of the resistor 30, and a given substantial sensitive section is limited to a local region where the resistor 30 is formed, a significant effect of improving accuracy in detecting strain is obtained. Also, by setting the resistance of the line 40 to be lower than that of the resistor 30, the effect of reducing transverse sensitivity is also obtained.

A length L of each line 40 that connects the resistor 30 and a given electrode 50 is preferably 5 mm or more along the line 40, regardless of whether the line 40 is linear. By setting the length L to be 5 mm or more, heat generated when a lead wire or the like is soldered to each electrode 50 is less likely to be transferred to the cover layer 60 that covers the resistor 30 and the resistor 30. Thus, a thermal loading included in by various gauge characteristics can be reduced.

In consideration of a given strain limit, a suitable range for the width of each line 40 is obtained. This will be described below.

According to investigation, the inventors have found that a smaller width of the first metallic layer 41 of each line 40 indicates that less cracks and disconnection occur in response to strain that the line 40 receives. Specifically, the inventors fabricated a plurality of test strain gauges, for each of four types in which the width of the first metallic layer 41 was any one of 10 µm, 100 µm, 345 µm, and 560 µm, and then applied strain to each strain gauge. The inventors checked occurrence of any cracks and disconnections. In this test, each first metallic layer 41 was a Cr composite film having the thickness of 0.2 µm, and the second metallic layer 42 was not laminated on the first metallic layer 41.

As a result of the test, it has been confirmed that as the width of the first metallic layer 41 becomes narrower, any cracks and disconnection tend to be reduced. It has been found that a given strain limit is dependent on the width of the first metallic layer 41. The strain limit refers to a value indicating mechanical strain that causes any cracks or disconnection to occur when strain is applied to a given strain gauge.

Figure 4:
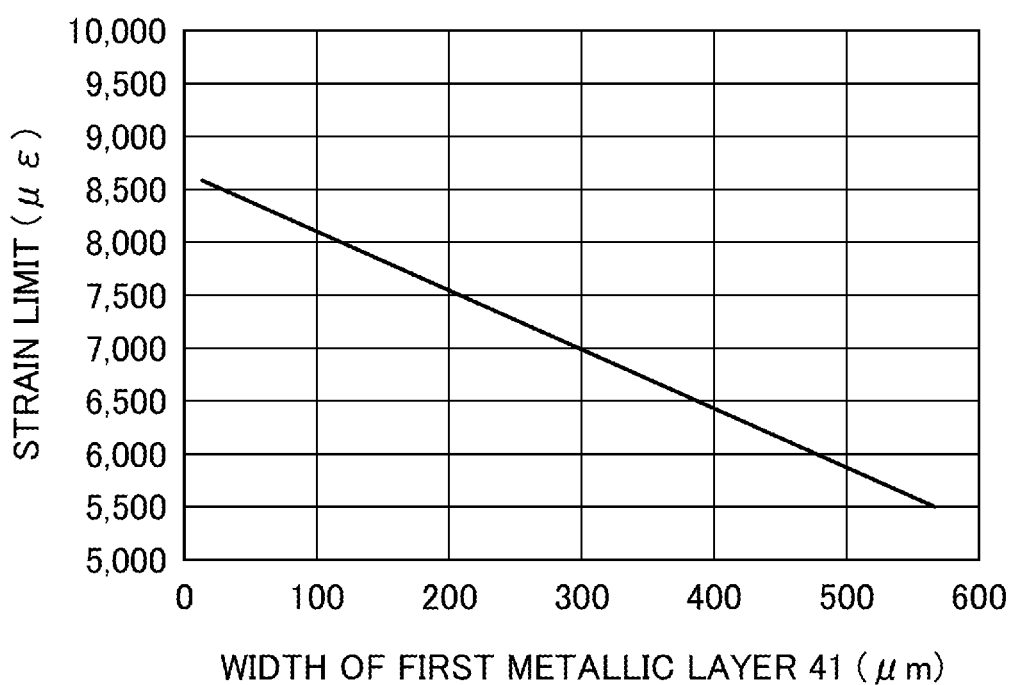
FIG. 4 is a diagram illustrating a test result for a strain limit.

FIG. 4 is a diagram illustrating the test result for the strain limit, and in FIG. 4, minimum values of strain limits that are obtained with respect to the test strain gauges are plotted. As illustrated in FIG. 4, according to the test result obtained by the inventors, when the width of the first metallic layer 41 was 560 µm, a given strain limit was 5500 us or more. In contrast, when the width of the first metallic layer 41 was 10 µm, a given strain limit was 8500 us or more. That is, when the width of the first metallic layer 41 is 10 µm, a given strain limit is about 1.5 times a strain limit obtained when the width of the first metallic layer 41 is 560 µm. Also, when the width of the first metallic layer 41 is 560 µm to 10 µm, the strain limit increases substantially linearly.

It is considered that the result described above is obtained because when the width of the first metallic layer 41, which is formed of the Cr composite film having an increased elastic modulus, is increased, brittle fracture is likely to occur and because, when the width of the first metallic layer 41 is reduced, apparent fracture resistance is increased. When the strain gauge 1 is actually used, the strain limit of about 8000µε is required, and thus the width of the first metallic layer 41 is preferably 100 µm or less. However, in view of a manufacturing process, it is difficult to set the width of the first metallic layer 41 to less than 10 µm. In consideration of the above issue, it has been seen that the width of the first metallic layer 41 is preferably greater than or equal to 10 µm and less than or equal to 100 µm.

According to another investigation, the inventors have found that when a copper layer, as the second metallic layer 42, having the thickness of 3 μm is solidly formed on the first metallic layer 41, a given strain limit is further improved to be 1.5 to 2 times a strain limit obtained in a case where any second metallic layer is not formed regardless of the width of the first metallic layer 41. The copper layer is excellently stretchable, compared to the Cr composite film. Thus, it is considered that the strain limit is further improved by laminating the copper layer on the Cr composite film.

That is, from the viewpoint of further improving the strain limit, the second metallic layer 42 is preferably formed of a material that is more stretchable than the first metallic layer 41. That is, preferably, the second metallic layer is formed of a material that has a lower resistance than the first metallic layer and is more stretchable than the first metallic layer 41. When the first metallic layer is a Cr composite film, examples of the material, which has a lower resistance than the first metallic layer and that is more stretchable than the first metallic layer 41, include gold, silver, and aluminum, in addition to copper. It is considered that the same result is obtained even when the materials described above are used for the second metallic layer 42.

The strain gauge 1 can be also used in a weighing application. When the strain gauge 1 is used in the weighing application, it needs to conform to the standards concerning creep. The standards concerning creep include, for example, accuracy class C1 (hereinafter referred to as the C1 standard) specified by OIML R60, and include accuracy class C2 (hereinafter referred to as the C2 standard) specified by OIML R60.

In the C1 standard, each of a given creep amount and a given creep recovery amount requires to correspond to +0.0735% or less. In the C2 standard, each of a given creep amount and a given creep recovery amount requires to correspond to +0.0368% or less. When the strain gauge 1 is used in a sensor application, each of a given creep amount and a given creep recovery amount is specified to correspond to about +0.5%.

According to the investigation by the inventors, a creep amount and a creep recovery amount are influenced by a viscoelasticity term for a given material that constitutes the resistor 30. That is, in a flexure element used in the weighing application, tension or compression occurs in a longitudinal direction (direction illustrated in the A-A line in FIG. 1) of the resistor 30. When the resistor 30 expands and contracts longitudinally due to tension or compression of the flexure element, a given creep amount and creep recovery amount are increased. Thus, expansion and contraction of the resistor 30 in the longitudinal direction are preferably suppressed.

When each line 40 has a structure in which the second metallic layer 42 is laminated on the first metallic layer 41, and the volume of a given metal that constitutes the line 40 is increased, expansion and contraction of the resistor 30 in the longitudinal direction can be suppressed. As a result, each of a given creep amount and a given recovery amount can be suppressed, and thus the C1 standard or the C2 standard can be satisfied.

Further, when each electrode 50 has a structure in which the second metallic layer 52 is laminated on the first metallic layer 51, and the volume of a given metal that constitutes the electrode 50 is increased, expansion and contraction of the resistor 30 in the longitudinal direction can be further suppressed. As a result, each of a given creep amount and a given recovery amount can be further suppressed.

An extent to which a given creep amount and a given recovery amount are suppressed can be adjusted by the thicknesses of the second metallic layers 42 and 52. Even when the strain gauge 1 is used in the weighing application, as described above, the second metallic layers 42 and 52 are preferably formed of a material having a lower resistance than the first metallic layers 41 and 51 (i.e., the resistor 30).

When the volume of the resistor 30 itself is increased, the resistance of the resistor 30 is reduced, and thus it is undesirable in terms of applications. However, when the second metallic layers 42 and 52 are respectively laminated on the first metallic layers 41 and 51, stiffness of the strain gauge 1 can be increased without reducing any resistance of the resistor 30.

Each of the creep amount and creep recovery amount is an amount that varies over time of an elastically deformed amount (strain amount) of a given surface on which the resistor 30 is provided in the strain gauge 1. With this arrangement, each of the creep amount and creep recovery amount can be measured by monitoring a voltage, obtained due to strain, that is calculated based on the output between the pair of electrodes 50.

In order to manufacture the strain gauge 1, first, the substrate 10 is prepared and a metallic layer (referred to as a metallic layer A for the sake of convenience) is formed on the upper surface 10a of the substrate 10. The metallic layer A is a layer that is finally patterned to become the resistor 30, the first metallic layer 41, and the second metallic layer 51. With this arrangement, the material and thickness of the metallic layer A are the same as the material and thickness for each of the resistor 30, the first metallic layer 41, and the second metallic layer 51, as described above.

The metallic layer A can be deposited by magnetron sputtering in which, for example, a source material capable of forming the metallic layer A is a target. Instead of the magnetron sputtering, the metallic layer A may be deposited by reactive sputtering, vapor deposition, arc ion plating, pulsed laser deposition, or the like.

From the viewpoint of stabilizing the gauge characteristics, before the depositing of the metallic layer A, a functional layer, as a base layer, that has a predetermined film thickness, is preferably vacuum-deposited on the upper surface 10a of the substrate 10, by conventional sputtering, for example.

In the present application, the functional layer refers to a layer that has a function of promoting crystal growth of the metallic layer A (resistor 30) that is at least an upper layer. Also, the functional layer preferably has a function of preventing oxidation of the metallic layer A caused by oxygen and moisture that are contained in the substrate 10, as well as a function of improving adhesion between the substrate 10 and the metallic layer A. The functional layer may further have any other function.

The insulating resin film that constitutes the substrate 10 contains oxygen and moisture. In this regard, particularly when the metallic layer A includes Cr, it is effective for the functional layer to have a function of preventing oxidation of the metallic layer A, because Cr forms an autoxidized film.

The material of the functional layer is not particularly restricted as long as that material is material having a function of promoting crystal growth of the metallic layer A (resistor 30) that is at least an upper layer. Such material can be appropriately selected for any purpose and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed of a conductive material such as a metal or an alloy, the film thickness of the functional layer is preferably one-twentieth or less the film thickness of the resistor. When such a range is set, crystal growth of α-Cr can be promoted, and further, a portion of the current flowing through the resistor flows through the functional layer. Thus, reductions in detection sensitivity of strain can be prevented.

More preferably, when the functional layer is formed of the conductive material such as a metal or an alloy, the film thickness of the functional layer is one-fiftieth or less the film thickness of the resistor. When such a range is set, crystal growth of α-Cr can be promoted, and further, a portion of the current flowing through the resistor flows through the functional layer. Thus, reductions in detection sensitivity of strain can be further prevented.

When the functional layer is formed of the conductive material such as a metal or an alloy, the film thickness of the functional layer is further preferably one-hundredth or less the film thickness of the resistor. When such a range is set, a portion of the current flowing through the resistor flows through the functional layer, and thus reductions in detection sensitivity of strain can be further prevented.

When the functional layer is formed of an insulating material such as an oxide or a nitride, the film thickness of the functional layer is preferably 1 nm to 1 μm. When such a range is set, crystal growth of α-Cr can be promoted, and further, a given film can be easily formed without having any cracks in the functional layer.

When the functional layer is formed of the insulating material such as an oxide or a nitride, the film thickness of the functional layer is preferably 1 nm to 0.8 μm. When such a range is set, crystal growth of α-Cr can be promoted, and a given film can be further easily formed without having any cracks in the functional layer.

When the functional layer is formed of the insulating material such as an oxide or a nitride, the film thickness of the functional layer is more preferably 1 nm to 0.5 μm. When such a range is set, crystal growth of α-Cr can be promoted, and further, a given film can be formed more easily without having any cracks in the functional layer.

The planar shape of the functional layer is patterned to be substantially the same as the planar shape of the resistor as illustrated in FIG. 1. However, the planar shape of the functional layer is not limited when it is substantially the same as the planar shape of the resistor. When the functional layer is formed of an insulating material, the planar shape of the functional layer may not be patterned to be the same shape as the planar shape of the resistor. In this case, the functional layer may be solidly formed to correspond to a region where at least the resistor is formed. Alternatively, the functional layer may be solidly formed on the entire top surface of the substrate 10.

When the functional layer is formed of an insulating material, the functional layer is formed to be relatively thick such that the thickness of the functional layer is greater than or equal to 50 nm and less than or equal to 1 μm, and further, the functional layer is formed solidly. With this arrangement, the thickness and surface area of the functional layer are increased, and thus heat obtained when the resistor generates the heat can be dissipated toward the substrate 10. As a result, in the strain gauge 1, reductions in measurement accuracy due to self-heating of the resistor can be suppressed.

The functional layer can be vacuum-deposited by, for example, conventional sputtering in which a source material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of the film of the functional layer is minimized and thus the effect of improving adhesion can be obtained.

However, this is an example of a method of depositing the functional layer, and the functional layer may be formed by any other method. For example, before depositing of the functional layer, the upper surface 10a of the substrate 10 is activated by plasma treatment or the like using Ar or the like to thereby obtain the effect of improving the adhesion, and subsequently, the functional layer may be vacuum-deposited by magnetron sputtering.

A combination of the material of the functional layer and the material of the metallic layer A is not particularly restricted, and can be appropriately selected for any purpose. For example, Ti is used for the functional layer, and a Cr composite film formed with α-Cr (alpha-chromium) as the main component can be deposited as the metallic layer A.

In this case, the metallic layer A can be deposited by, for example, magnetron sputtering in which a source material capable of forming the Cr composite film is the target and in which an Ar gas is supplied to a chamber. Alternatively, the metallic layer A may be deposited by reactive sputtering in which pure Cr is the target and in which an appropriate amount of nitrogen gas, as well as an Ar gas, are supplied to a chamber. In this case, by changing a supplied amount of the nitrogen gas or pressure (nitrogen partial pressure) of the nitrogen gas, or by providing a heating process to adjust heating temperature, a percentage of CrN and $Cr_2N$ included in the Cr composite film, as well as a percentage of $Cr_2N$ in CrN and $Cr_2N$, can be adjusted.

In such methods, a growth face of the Cr composite film is defined by the functional layer formed of Ti, and the Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/C to +1000 ppm/° C. When the functional layer is formed of Ti, the Cr composite film may include Ti or TiN (titanium nitride).

When the metallic layer A is the Cr composite film, the functional layer formed of Ti includes all functions of a function of promoting crystal growth of the metallic layer A, a function of preventing oxidation of the metallic layer A caused by oxygen or moisture contained in the substrate 10, and a function of improving adhesion between the substrate 10 and the metallic layer A. Instead of Ti, when the functional layer is formed of Ta, Si, Al, or Fe, the functional layer also includes the same functions.

As described above, with the functional layer being provided in the lower layer of the metallic layer A, the crystal growth of the metallic layer A can be promoted and thus the metallic layer A having a stable crystalline phase can be fabricated. As a result, for the strain gauge 1, stability of the gauge characteristics can be improved. Also, a given material that constitutes the functional layer is diffused into the metallic layer A, and thus the gauge characteristics of the strain gauge 1 can be improved.

Then, the second metallic layer 42 and the second metallic layer 52 are formed on the upper surface of the metallic layer A. The second metallic layer 42 and the second metallic layer 52 can be formed by, for example, photolithography.

Specifically, first, a seed layer is formed so as to cover the upper surface of the metallic layer A, for example, by sputtering, electroless plating, or the like. Subsequently, a photosensitive resist is formed on the entire upper surface of the seed layer, and then an opening, through which a region where the second metallic layer 42 and the second metallic layer 52 are to be formed is exposed, is formed by performing exposure and development. As the resist, for example, a dry film resist or the like can be used.

Then, the second metallic layer 42 and the second metallic layer 52 are formed on the seed layer exposed in the opening, for example, by electrolytic plating in which the seed layer becomes a power feed path. The electrolytic plating is preferable in terms of the fact that a better line cycle time is obtained and that an electrolytic plating layer having a low stress can be formed as the second metallic layer 42 and the second metallic layer 52. When the electrolytic plating layer having an increased film thickness has a low stress, warp of the strain gauge 1 can be prevented from being generated. The second metallic layer 42 and the second metallic layer 52 may be formed by electroless plating.

Then, the resist is removed. The resist can be removed, for example, by immersion in a solution capable of dissolving the material of the resist.

Then, a photosensitive resist is formed on the entire upper surface of the seed layer, and is patterned by performing exposure and development to have a planar shape similar to that of the resistor 30, the lines 40, and the electrodes 50 as illustrated in FIG. 1. As the resist, for example, a dry film resist or the like can be used. Subsequently, with use of the resist as an etch mask, the metallic layer A and the seed layer that are exposed through the resist are removed to form the resistor 30, the lines 40, and the electrodes 50 each of which has the planar shape illustrated in FIG. 1.

For example, an unnecessary portion of the metallic layer A and seed layer can be removed by wet etching. When a given functional layer is formed in a lower layer of the metallic layer A, the functional layer is patterned by etching to have the planar shape illustrated in FIG. 1, as in the resistor 30, the lines 40, and the electrodes 50. At this time, the seed layer is formed on the resistor 30, the first metallic layer 41, and the first metallic layer 51.

Then, when the second metallic layer 42 and the second metallic layer 52 are used as an etching mask, an unnecessary seed layer that is exposed through the second metallic layer 42 and the second metallic layer 52 is removed, and thus the second metallic layer 42 and the second metallic layer 52 are formed. The seed layer situated underneath the second metallic layer 42 and the second metallic layer 52 remains. For example, the unnecessary seed layer can be removed by wet etching that uses an etchant with which the seed layer is etched and the functional layer, the resistor 30, the lines 40, and the electrodes 50 are not etched.

Then, a cover layer, with which the resistor 30 and lines 40 are coated and through which the electrodes 50 are exposed, is provided on and above the upper surface 10a of the substrate 10, as necessary, so that the strain gauge 1 is completed. For example, the cover layer can be fabricated by laminating, on the upper surface 10a of the substrate 10, a thermosetting insulating resin film in a semi-cured state such that the resistor 30 and lines 40 are coated therewith and the electrodes 50 are exposed, and by performing heating to cure the thermosetting insulating resin film. The cover layer may be formed by applying, to the upper surface 10a of the substrate 10, a thermosetting insulating resin that is liquid or paste-like, such that the resistor 30 and lines 40 are coated therewith and the electrodes 50 are exposed, and by performing heating to cure the thermosetting insulating resin.

Figure 5:
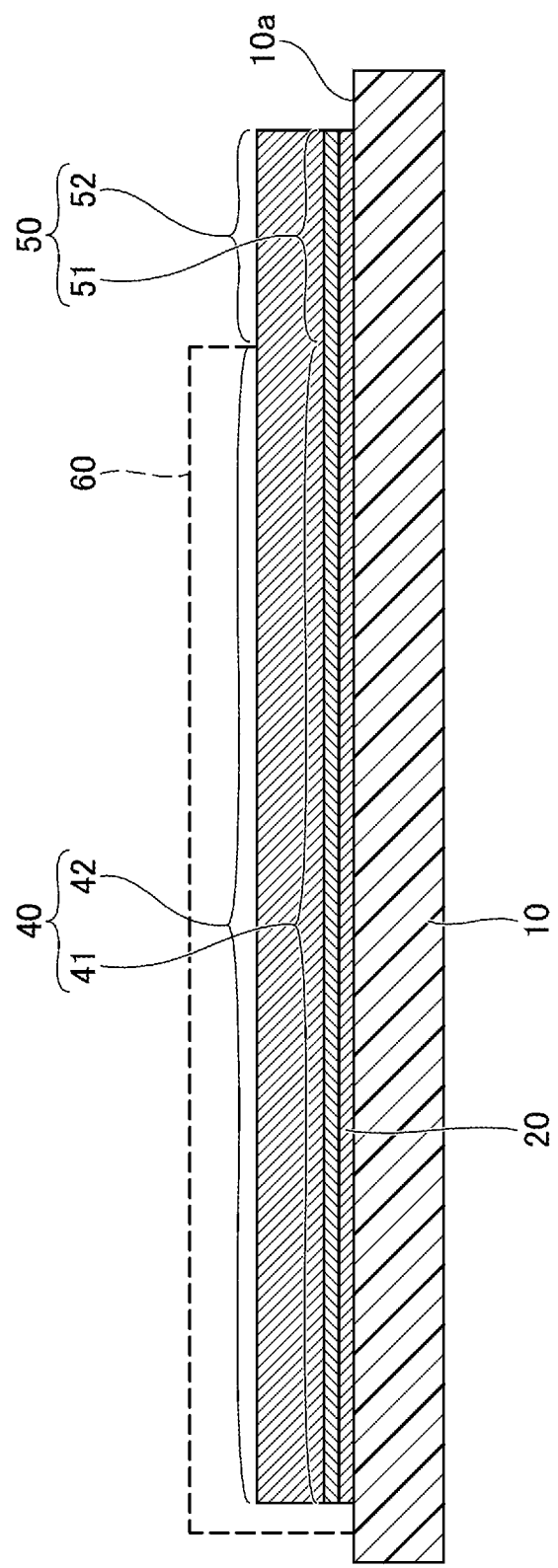
FIG. 5 is a cross-sectional view (third part) of an example of the strain gauge according to the first embodiment.

When the functional layer, as a base layer of the resistor 30, the first metallic layer 41, and the first metallic layer 51, is provided on the upper surface 10a of the substrate 10, the strain gauge 1 has a cross-section shape illustrated in FIG. 5. A layer indicated by the numeral 20 expresses the functional layer. When the functional layer 20 is provided, the planar shape of the strain gauge 1 is illustrated as in FIG. 1, for example. However, as described above, the functional layer 20 may be solidly formed on a portion or entirety of the upper surface of the substrate 10.

First Modification of First Embodiment

A first modification of the first embodiment illustrates an example in which the width of each line does not stay constant. In the first modification of the first embodiment, description for the same components as those described in the embodiment may be omitted.

Figure 6:
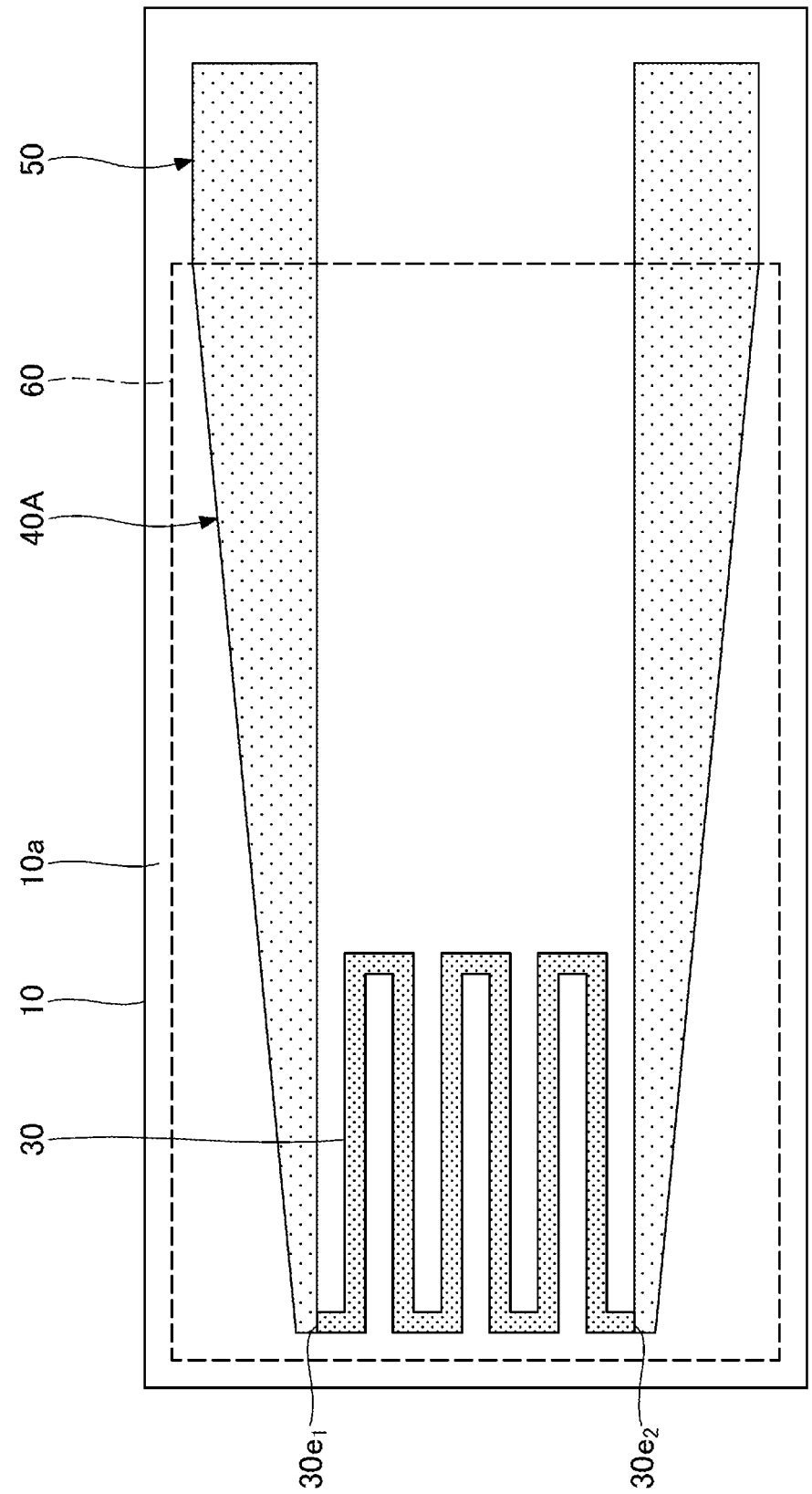
FIG. 6 is a plan view of an example of the strain gauge according to a first modification of the first embodiment.

FIG. 6 is a plan view of the strain gauge according to the first modification of the first embodiment. For the strain gauge according to the first modification of the first embodiment, a cross-sectional structure is the same as that illustrated in FIGS. 2 and 3.

Referring to FIG. 6, a strain gauge 1A differs from the strain gauge 1 (see FIG. 1 and the like) in that lines 40A are used instead of the lines 40. In the strain gauge 1A, the width of each line 40A is the narrowest when the line is situated at the resistor 30. The width of each line 40A is gradually increased toward a corresponding electrode 50.

As described above, the width of each line 40A is the narrowest when the line is situated at the resistor 30, and the width of the line 40A is gradually increased toward the electrode 50. With this arrangement, at a connection portion of the resistor 30 and a given line 40A, a portion of which the width varies significantly is no longer present. Thus, the resistor 30 and lines 40 are easily patterned by etching. In this case, as described above, in consideration of the strain limit, the width of each line 40A is preferably varied within the range of 10 μm through 100 μm.

In the example illustrated in FIG. 6, in the entirety of each line 40A, the width of the line 40A is the narrowest when the line 40A is situated at the resistor 30, and the width of the line 40A is gradually increased toward the electrode 50. However, such a manner is not limiting. When each line 40A includes a portion of which the width is gradually increased toward the electrode 50 from the resistor 30, it is sufficient. For example, for each line 40A, the width is the narrowest when the line is situated at the resistor 30, and is gradually increased toward the electrode 50 before a predetermined distance is reached, and further, the width may stay constant after the predetermined distance is reached.

Second Modification of First Embodiment

A second modification of the first embodiment illustrates an example of the strain gauge in which a plurality of resistors are formed on the substrate. In the second modification of the first embodiment, description for the same components as those described in the embodiments may be omitted.

Figure 7:
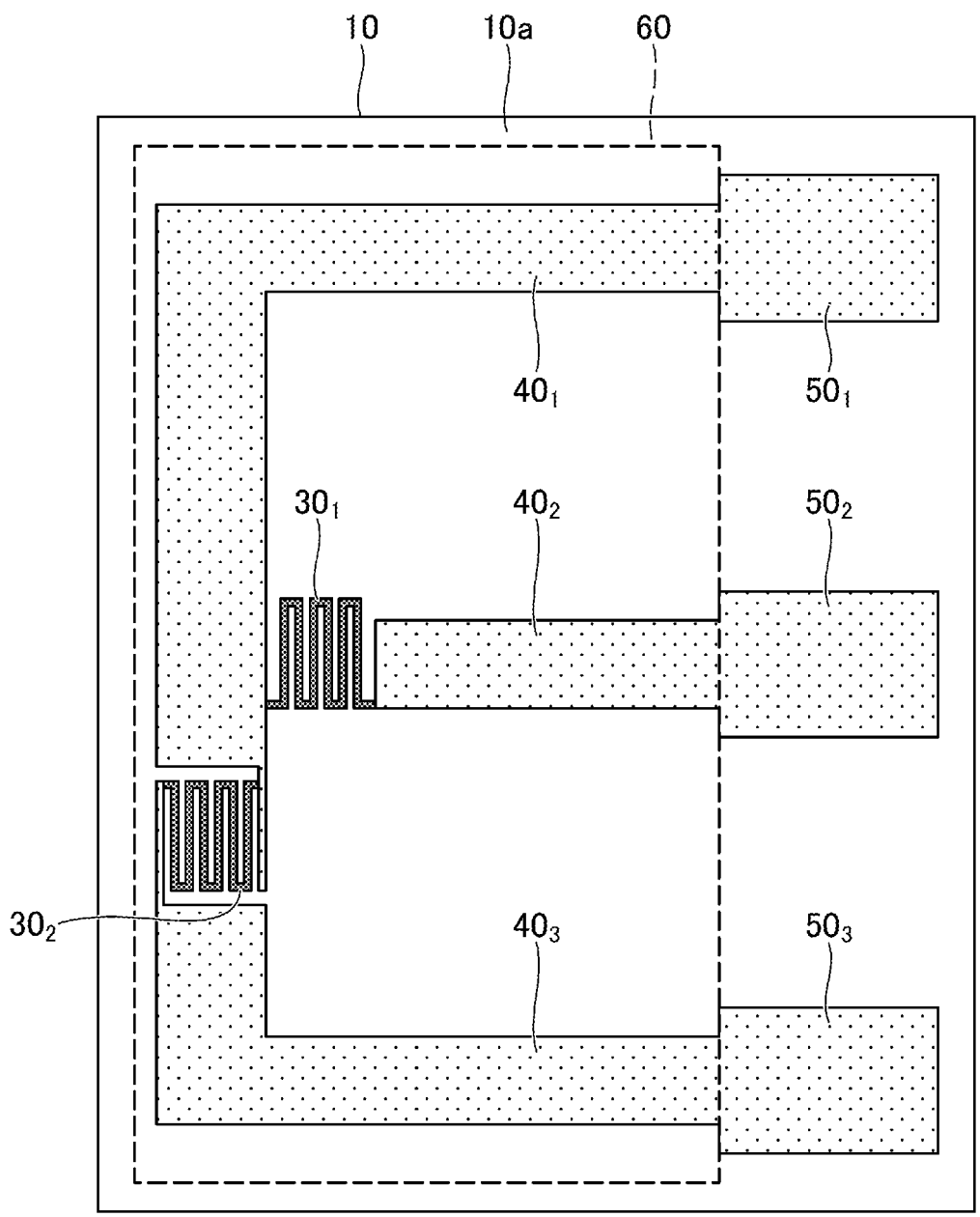
FIG. 7 is a plan view of an example of the strain gauge according to a second modification of the first embodiment.

FIG. 7 is a plan view of the strain gauge according to the second modification of the first embodiment. For the strain gauge according to the second modification of the first embodiment, a cross-sectional structure is illustrated as in FIGS. 2 and 3.

Referring to FIG. 7, a strain gauge 1B differs from the strain gauge 1 (see FIGS. 1 to 3) in that the strain gauge 1B includes resistors $30_1$ and $30_2$. The material, the film thickness, and the like of each of the resistors $30_1$ and $30_2$ are set, as in the resistor 30 described in the first embodiment.

In a strain gauge 1B, the resistor $30_1$ is electrically coupled, at one end, to an electrode $50_1$ via a line $40_1$, and is electrically coupled to one end of the resistor $30_2$. The other end of the resistor $30_1$ is electrically coupled to an electrode $50_2$ via a line $40_2$. The other end of the resistor $30_2$ is electrically coupled to an electrode $50_3$ via a line $40_3$.

That is, in the strain gauge 1B, the resistors $30_1$ and $30_2$ are used to constitute a half-bridge circuit.

As in the lines 40 described in the first embodiment, each of the lines $40_1$, $40_2$, and $40_3$ has a structure in which the second metallic layer 42 is laminated on the first metallic layer 41 that is made of the same material as the resistors $30_1$ and $30_2$. With this arrangement, each of the lines $40_1$, $40_2$, and $40_3$ has a lower resistance than the resistors $30_1$ and $30_2$. Thus, each of the lines $40_1$, $40_2$, and $40_3$ can be inhibited from functioning as a resistor. As a result, accuracy in detecting strain through the resistors $30_1$ and $30_2$ can be improved.

In other words, by providing the lines $40_1$, $40_2$, and $40_3$ each of which has a lower resistance than the resistors $30_1$ and $30_2$, a substantial sensitive section of the strain gauge 1B can be limited to a local region where the resistors $30_1$ and $30_2$ are formed. With this arrangement, accuracy in detecting strain through the resistors $30_1$ and $30_2$ can be improved. The effect obtained when the Cr composite film is used as each of the resistors, as well as the effect relating to the length of each line that connects a given resistor and a given electrode, are obtained as in the first embodiment.

A portion of the line $40_1$ allows for a connection between the resistor $30_1$ and the resistor $30_2$. As described above, each line having a low resistance may be used to connect a given resistor and a given electrode, as well as serving as a portion that connects resistors. With this arrangement, as described above, accuracy in detecting strain through the resistors $30_1$ and $30_2$ can be improved.

Third Modification of First Embodiment

A third modification of the first embodiment illustrates another example of the strain gauge that includes a plurality of resistors. In the third modification of the first embodiment, description for the same components as those described in the embodiment may be omitted.

Figure 8:
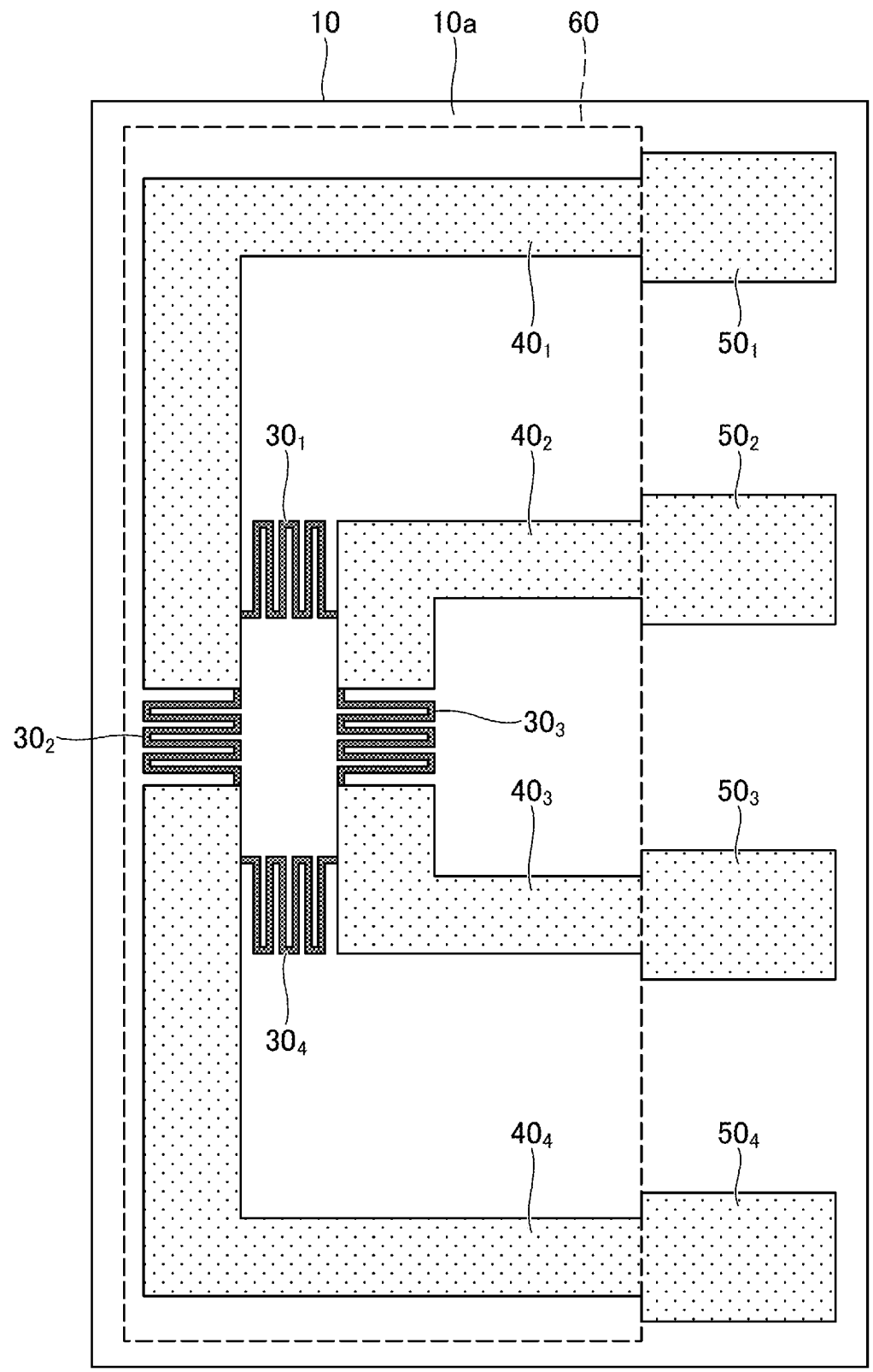
FIG. 8 is a plan view of an example of the strain gauge according to a third modification of the first embodiment.

FIG. 8 is a plan view of the strain gauge according to the third modification of the first embodiment.

For the strain gauge according to the third modification of the first embodiment, the cross-sectional structure is illustrated as in FIGS. 2 and 3.

Referring to FIG. 8, a strain gauge 1C differs from the strain gauge 1 (see FIGS. 1 to 3) in that the strain gauge 1C includes resistors $30_1$, $30_2$, $30_3$, and $30_4$. The material, the film thickness, and the like of each of the resistors $30_1$, $30_2$, $30_3$, and $30_4$ are set, as in the resistor 30 described in the first embodiment.

In the strain gauge 1C, the resistor $30_1$ is electrically connected, at one end, to the electrode $50_1$ via the line $40_1$, and is electrically connected to one end of the resistor $30_2$. The resistor $30_1$ is electrically connected, at the other end, to the electrode $50_2$ via the line $40_2$, and is electrically connected to one end of the resistor $30_3$.

The resistor $30_2$ is electrically connected, at the other end, to an electrode $50_4$ via a line $40_4$, and is electrically connected to one end of the resistor $30_4$. The resistor $30_3$ is electrically connected, at the other end, to the electrode $50_3$ via the line $40_3$, and is electrically coupled to the other end of the resistor $30_4$.

That is, in the strain gauge 1C, the resistors $30_1$, $30_2$, $30_3$, and $30_4$ are used to constitute a full-bridge circuit.

As in the lines 40 described in the first embodiment, each of the lines $40_1$, $40_2$, $40_3$, and $40_4$ has a structure in which the second metallic layer 42 is laminated on the first metallic layer 41 that is made of the same material as the resistors $30_1$, $30_2$, $30_3$, and $30_4$. With this arrangement, the resistance of each of the lines $40_1$, $40_2$, $40_3$, and $40_4$ is lower than that of the resistors $30_1$, $30_2$, $30_3$, and $30_4$. Thus, each of the lines $40_1$, $40_2$, $40_3$, and $40_4$ can be inhibited from functioning as a resistor. As a result, accuracy in detecting strain through the resistors $30_1$, $30_2$, $30_3$, and $30_4$ can be improved.

In other words, by providing the lines $40_1$, $40_2$, $40_3$, and $40_4$ each of which has a lower resistance than the resistors $30_1$, $30_2$, $30_3$, and $30_4$, a substantial sensitive section of the strain gauge 1C can be limited to a local region where the resistors $30_1$, $30_2$, $30_3$, and $30_4$ are formed. With this arrangement, accuracy in detecting strain through the resistors $30_1$, $30_2$, $30_3$, and $30_4$ can be improved. The effect obtained when a Cr composite film is used as each resistor, as well as the effect relating to the length of each line that connects a given resistor and a given electrode, are obtained as in the first embodiment.

A portion of the line $40_1$ allows for a connection between the resistor $30_1$ and the resistor $30_2$. Also, a portion of the line $40_2$ allows for a connection between the resistor $30_1$ and the resistor $30_3$. A portion of the line $40_3$ allows for a connection between the resistor $30_3$ and the resistor $30_4$. Further, a portion of the line $40_4$ allows for a connection between the resistor $30_2$ and the resistor $30_4$. As described above, each line having a low resistance may be used to connect a given resistor and a given electrode, as well as serving as a portion that connects resistors. With this arrangement, as described above, accuracy in detecting strain through the resistors $30_1$, $30_2$, $30_3$, and $30_4$ can be improved.

Although the preferred embodiments and the like have been described above in detail, these embodiments and the like are not limiting. Various modifications and alternatives to the above embodiments and the like can be made without departing from a scope set forth in the claims.

This International application claims priority to Japanese Patent Application Nos. 2020-069842, filed Apr. 8, 2020, 2020-174823, filed Oct. 16, 2020, and 2021-055762, filed Mar. 29, 2021, the contents of which are incorporated herein by reference in their entirety.

REFERENCE SIGNS LIST 1, 1A, 1B, 1C strain gauge, 10 substrate, 10a upper surface, 20 functional layer, 30, $30_1$, $30_2$, $30_3$, $30_4$ resistor, $30e_1$, $30e_2$ end, 40, $40_1$, $40_2$, $40_3$, $40_4$ line, 50, $50_1$, $50_2$, $50_3$, $50_4$ electrode, 41, 51 first metallic layer, 42, 52 second metallic layer, 60 cover layer

The invention claimed is:

1. A strain gauge comprising:
   a flexible substrate;
   at least one resistor formed on or above the substrate; and
   a pair of electrodes formed on or above the substrate, electrodes in the pair being electrically coupled to the resistor via lines, respectively,
   wherein each of the lines electrically connects an end of the resistor and a given electrode among the pair of electrodes, the end being situated in a width direction of a grid,
   wherein each of the lines includes
      a first metallic layer, and
      a second metallic layer that is formed of a material having a lower resistance than a material of the first metallic layer, the second metallic layer being situated on the first metallic layer,
   wherein the first metallic layer has a width in a range of greater than or equal to 10 μm and less than or equal to 100 μm, and
   wherein a strain limit of the strain gauge increases linearly as the width of the first metallic layer decreases within the range.

2. The strain gauge according to claim 1, wherein the at least one resistor includes a plurality of resistors that are formed on or above the substrate, and wherein each of the lines serves as a portion that connects given resistors among the plurality of resistors.

3. The strain gauge according to claim 1, wherein the first metallic layer is integrally formed of a same material as the resistor.

4. The strain gauge according to claim 1, wherein each of the electrodes includes
   the first metallic layer, and
   the second metallic layer that is formed of the material having the lower resistance than the material of the first metallic layer, the second metallic layer being situated on the first metallic layer.

5. The strain gauge according to claim 1, wherein the second metallic layer is formed of a material that is more stretchable than the material of the first metallic layer.

6. The strain gauge according to claim 1, wherein the resistor is formed of a film that includes a mixture of Cr, CrN, and $Cr_2N$.

7. The strain gauge according to claim 6, wherein a gauge factor is 10 or more.

8. The strain gauge according to claim 6, wherein CrN and $Cr_2N$ included in the resistor are at 20% by weight or less.

9. The strain gauge according to claim 8, wherein a percentage of $Cr_2N$ in the CrN and $Cr_2N$ is greater than or equal to 80% by weight and less than 90% by weight.

* * * * *